United States Patent [19]

Mizushima

[11] Patent Number: 4,794,518
[45] Date of Patent: Dec. 27, 1988

[54] PIPELINE CONTROL SYSTEM FOR AN EXECUTION SECTION OF A PIPELINE COMPUTER WITH MULTIPLE SELECTABLE CONTROL REGISTERS IN AN ADDRESS CONTROL STAGE

[75] Inventor: Yoshihiro Mizushima, Kawasaki, Japan

[73] Assignee: Fujitsu Limited, Kawasaki, Japan

[21] Appl. No.: 780,645

[22] Filed: Sep. 26, 1985

Related U.S. Application Data

[63] Continuation-in-part of Ser. No. 647,388, Sep. 5, 1984, abandoned, which is a continuation of Ser. No. 253,504, Apr. 1, 1981, abandoned.

[51] Int. Cl.[4] .............................................. G06F 9/38
[52] U.S. Cl. ....................................................... 364/200
[58] Field of Search ... 364/200 MS File, 900 MS File

[56] References Cited

U.S. PATENT DOCUMENTS

| | | | |
|---|---|---|---|
| 3,875,391 | 4/1975 | Shapiro et al. | 364/200 |
| 3,949,379 | 4/1976 | Ball | 364/200 |
| 3,978,452 | 8/1976 | Barton | 364/200 |
| 4,025,771 | 5/1977 | Lynch, Jr. et al. | 364/200 |
| 4,075,704 | 2/1978 | O'Leary | 364/200 X |
| 4,112,489 | 9/1978 | Wood | 364/200 |
| 4,187,539 | 2/1980 | Eaton | 364/200 |
| 4,222,101 | 9/1980 | Ausan | 364/200 |
| 4,228,497 | 10/1980 | Gupta | 364/200 |
| 4,251,859 | 2/1981 | Momose et al. | 364/200 |
| 4,253,147 | 2/1981 | MacDougall et al. | 364/200 |
| 4,270,181 | 5/1981 | Tanakura | 364/200 X |
| 4,310,880 | 1/1982 | Gehman | 364/200 |
| 4,594,655 | 6/1986 | Mao et al. | 364/200 |
| 4,631,672 | 12/1986 | Sakamoto | 364/200 |

FOREIGN PATENT DOCUMENTS 53-81032  7/1978  Japan .

OTHER PUBLICATIONS

Sofer, D. and Sproul, W.W., "Parallel Pipeline Organization of Execution Unit", IBM Technical Disclosure Bulletin, vol. 14, No. 10, pp. 2930-2933.

*Primary Examiner*—Gary V. Harkcom
*Assistant Examiner*—David L. Clark
*Attorney, Agent, or Firm*—Staas & Halsey

[57] ABSTRACT

A pipeline control system for a computer in which predetermined tag data or micro instructions are stored in a plurality of tag registers while executing a first sequence of instructions in order to repetitively execute a flow of processing which is based upon the same. A required tag is selected from the tags stored in the tag registers in steps for executing second and subsequent sequences of instructions in which the same instructions can be repeated, so that the execution is initiated from a second phase without executing a first phase.

4 Claims, 7 Drawing Sheets

FIG. 1
*PRIOR ART*

| I | | I b2 | II | | III | | IV | | V | VI |
|---|---|---|---|---|---|---|---|---|---|---|
| Ia | Ib1 | | D | R | A | B1 B2 | E1 | E2 E2D | CK | W |
| 1 | | | | | | | | | | |
| 2 | 1 | | | | | | | | | |
| 3 | 2 | 1 | | | | | | | | |
| 4 | 3 | 2 | 1 | | | | | | | |
| 5 | 4 | 3 | 2 | 1 | | | | | | |
| 6 | 5 | 4 | 3 | 2 | 1 | | | | | |
| 7 | 6 | 5 | 4 | 3 | 2 | 1 | | | | |
| 8 | 7 | 6 | 5 | 4 | 3 | 2 | 1 | | | |
| 9 | 8 | 7 | 6 | 5 | 4 | 3 | 2 | 1 | | |
| 10 | 9 | 8 | 7 | 6 | 5 | 4 | 3 | 2 | 1 | |
| 11 | 10 | 9 | 8 | 7 | 6 | 5 | 4 | 3 | 2 | 1 |
| 12 | 11 | 10 | 9 | 8 | 7 | 6 | 5 | 4 | 3 | 2 |
| 13 | 12 | 11 | 10 | 9 | 8 | 7 | 6 | 5 | 4 | 3 | t0 t1 t2 t3 t4 t5 t6 t7 t8 t9 t10 t11 t12 t13

| SEQUENCE NUMBER | PH-1 TAG REGISTER | PH-2 TAG REGISTER NO. 1 | PH-2 TAG REGISTER NO. 2 | SS SIGNAL | FF SIGNAL | SEL OUTPUT | PH-3 TAG REGISTER |
|---|---|---|---|---|---|---|---|
| NO.0 | | | | 0 | 0 | | |
| NO.1 | TAGA 1 0 | | | 0 | 0 | | |
| NO.2 | TAGB 1 1 | TAGA 1 | | 0 | 0 ⊕ | TAGA 1 | TAGA |
| NO.3 | TAGC 0 0 | TAGA 1 | TAGB 1 | 0 | 0 ⊕ | TAGB 1 | TAGB |
| NO.4 | TAGC 0 0 | TAGA 1 | TAGB 1 | 0 | 0 ⊕ | TAGA 1 | TAGA |
| NO.5 | TAGD 0 0 | TAGA 1 | TAGB 1 | 1 | 0 EN | TAGB 1 | TAGB |
| NO.6 | TAGD 0 0 | TAGC 0 | TAGB 1 | 0 | 0 | TAGC 0 | TAGB |
| NO.7 | TAGE 0 0 | TAGD 0 | TAGB 1 | 0 | 0 | TAGD 0 | TAGC |

FIG. 8

PIPELINE CONTROL SYSTEM FOR AN EXECUTION SECTION OF A PIPELINE COMPUTER WITH MULTIPLE SELECTABLE CONTROL REGISTERS IN AN ADDRESS CONTROL STAGE

CROSS REFERENCES TO RELATED APPLICATIONS

This application is a continuation-in-part of U.S. application Ser. No. 647,388, filed Sept. 5, 1984, which is a continuation of U.S. application Ser. No. 253,504, filed Apr. 1, 1981, both of which are now abandoned.

BACKGROUND OF THE INVENTION

The present invention relates to a pipeline control system for a computer which repetitively reuses the contents of a second stage tag register while the next instructions are being read and loaded into an alternate second stage tag register.

Figure 1:
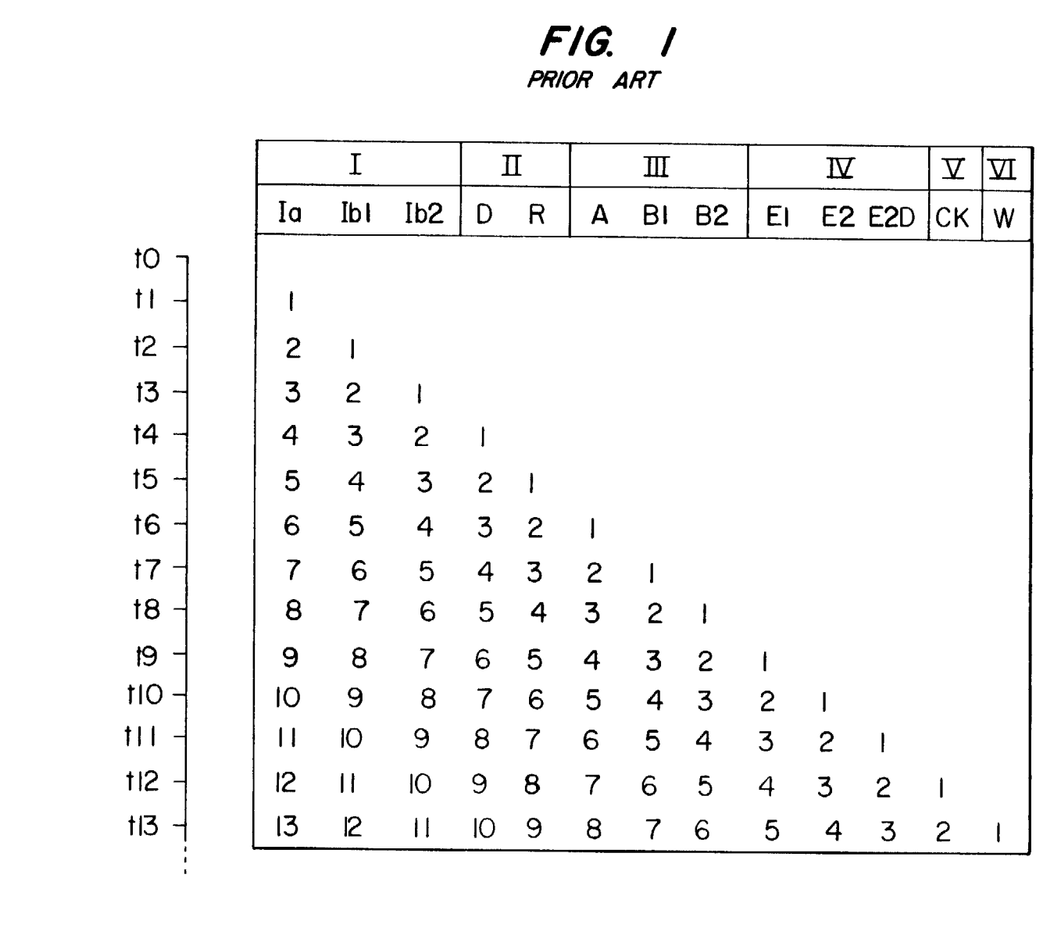
FIG. 1 is a diagram schematically illustrating, in series, an operation for pipeline-controlling an electronic computer.

In general, when an electronic computer is controlled using a pipeline control method, instructions 1 through 13 successively pass through processing stages I through VI according to a timing as determined by reference clock cycles t0, t1, t2, . . . , t13, as illustrated in FIG. 1. For example, in processing stage I, an instruction is read-out during processing cycles Ia, Ib1 and Ib2. In processing stage II, an instruction is decoded during processing cycles D and R and a microinstruction is produced. In processing stage III an operand is read out during processing cycles A, B1 and B2. In stage IV, an operation dictated by the decoded instruction is executed during processing cycles E1, E2 and E2D. In the stage V, the result of the operation is checked for branching control, etc., during a processing cycle CK. In the processing stage VI, the result of the operation is stored in general purpose registers during a processing cycle W.

Figures 2, 3:
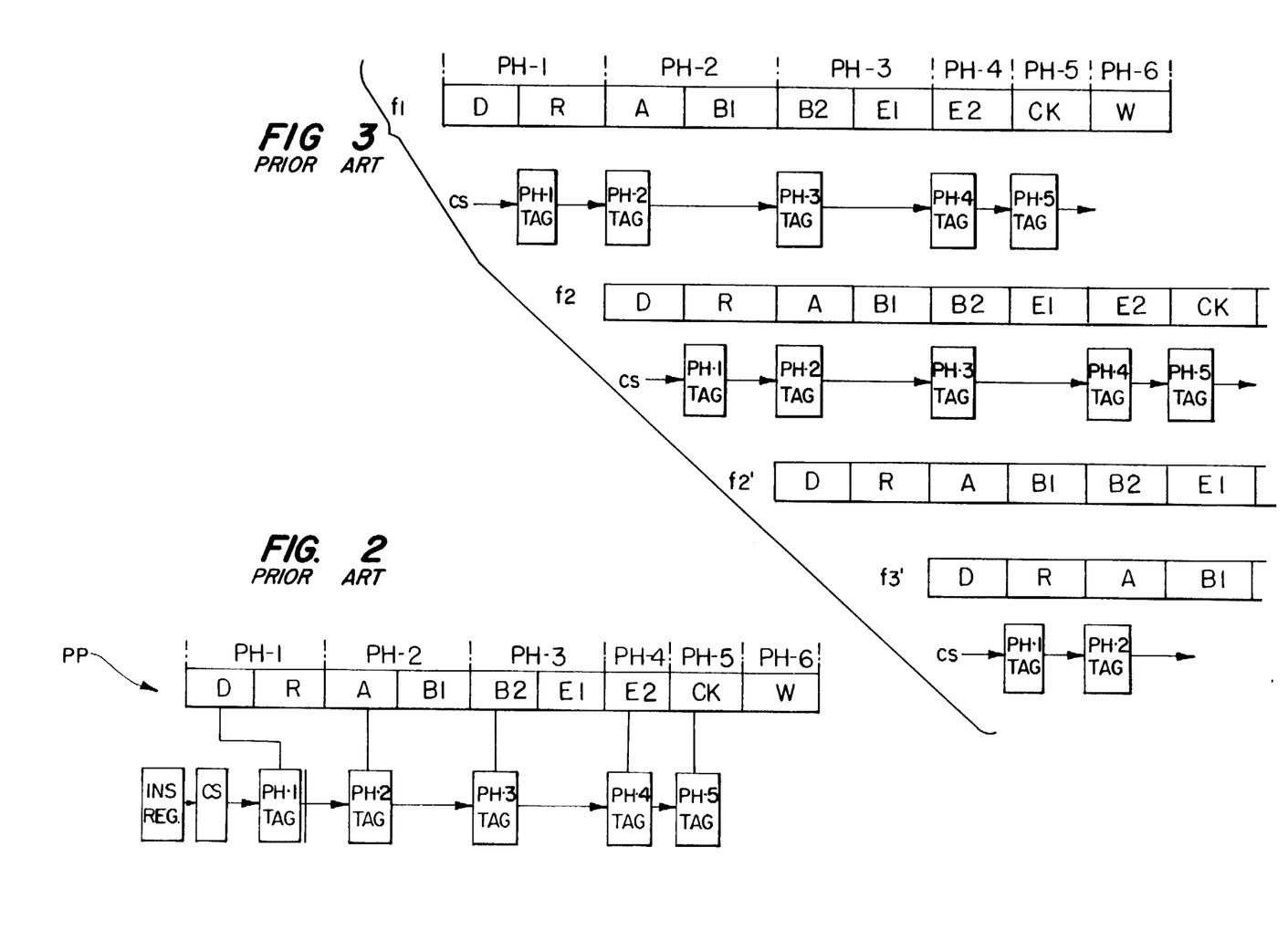
FIG. 2 is a diagram of tag registers which are arrayed in series to illustrate an operation of a conventional pipeline processor and control system.
FIG. 3 is a diagram illustrating, in series, an operation of a series of tag registers of FIG. 2.

In a pipeline control system as illustrated in FIG. 2, a processing flow is formed of a series of processing cycles consisting of cycle D, for decoding, cycle R, for reading, a cycle A, for address calculation, cycles B1 and B2, for operand read-out, cycles E1 and E2, for operation execution, cycle CK, for result checking, and cycle W result storage. These processing cycles are divided into phases and executed by a known pipeline processing unit PP. Namely, the cycles D and R are included in phase-1, the cycles A and B1 are included in phase 2, the cycles B2 and E1 are included in phase-3, the cycle E2 is included in phase-4, the cycle CK is included in phase-5, and the cycle W is included in phase-6. The processing flow is controlled by an instruction register INS REG, control storage CS, tag register of phase-1 PH.1 TAG, tag register of phase-2 PH.2 TAG, tag register of phase-3 PH.3 TAG, tag register of phase-4 PH.4 TAG, and tag register of phase-5 PH.5 TAG.

Tag data or execution control information (a microprogram instruction) that is necessary for executing the instructions stored in the instruction register are stored in the control storage CS. When instructions are to be executed, the tag data is successively or sequentially read out from the control storage CS in dependence upon the data in the instruction register INS REG, and supplied successively to the group of tag registers PH.1 TAG, PH.2 TAG, PH.3 TAG, PH.4 TAG and PH 5 TAG. When one instruction is switched to another instruction after a repeated execution instruction is finished, that is, a new instruction is to be executed, a procedure is required to withdraw or cancel the previously employed tag data and to introduce or fetch new tag. The above procedure, however, requires an additional operation flow f2' where f2' is a repeated execution flow. This additional flow f21 occurs because the decision concerning switching to the next instruction is made in phase-2 of the last operation flow of the present instruction, and at phase-2, the phase-1 of the next or repeated operation flow f2' has already started. With the system of FIG. 2, therefore, the operation speed of the whole apparatus tends to be decreased whenever a repeated execution instruction results in plural execution flows.

The present invention has been proposed to solve the above-mentioned wasted execution cycle problems inherent in conventional systems.

SUMMARY OF THE INVENTION

An object of the present invention is to increase the operation speed of a pipeline computer system by eliminating the additional operation flow or execution cycles which have hitherto been employed when one instruction was to be switched to another instruction after a multiple flow instruction has been executed.

According to the present invention, there is provided a pipeline control system for a computer in which the flows of processings successively proceed through a plurality of processing stages, predetermined tag data for each flow are simultaneously applied to each of the processing stages to simultaneously effect the processings through the processing stages of the different flows, such that a plurality of processing flows proceed successively while maintaining a time lag of a phase therebetween. Predetermined first tag data are stored in a plurality of second phase tag resisters during a step for executing a first sequence of operation flows in order to repetitively execute the flow of processing which is based upon the first tag data, and second tag data is selected from said tags stored in the second phase tag registers for executing second and subsequent operation flows in which the same operation flows can be repeated, so that the second execution flow is initiated from the second phase without executing a first phase for decoding the instruction meanwhile the tag data for the next instruction is also made available when the repeat instruction is finished. The prefetch of the tag data for a following instruction during execution of a repeat instruction improves processor efficiency by eliminating a wasted operation flow.

These together with other objects and advantages which will be subsequently apparent, reside in the details of construction and operation as more fully hereinafter described and claimed, reference being had to the accompanying drawings forming a part hereof, wherein like reference characters refer to like parts throughout.

DESCRIPTION OF THE PREFERRED EMBODIMENTS

Figure 4:
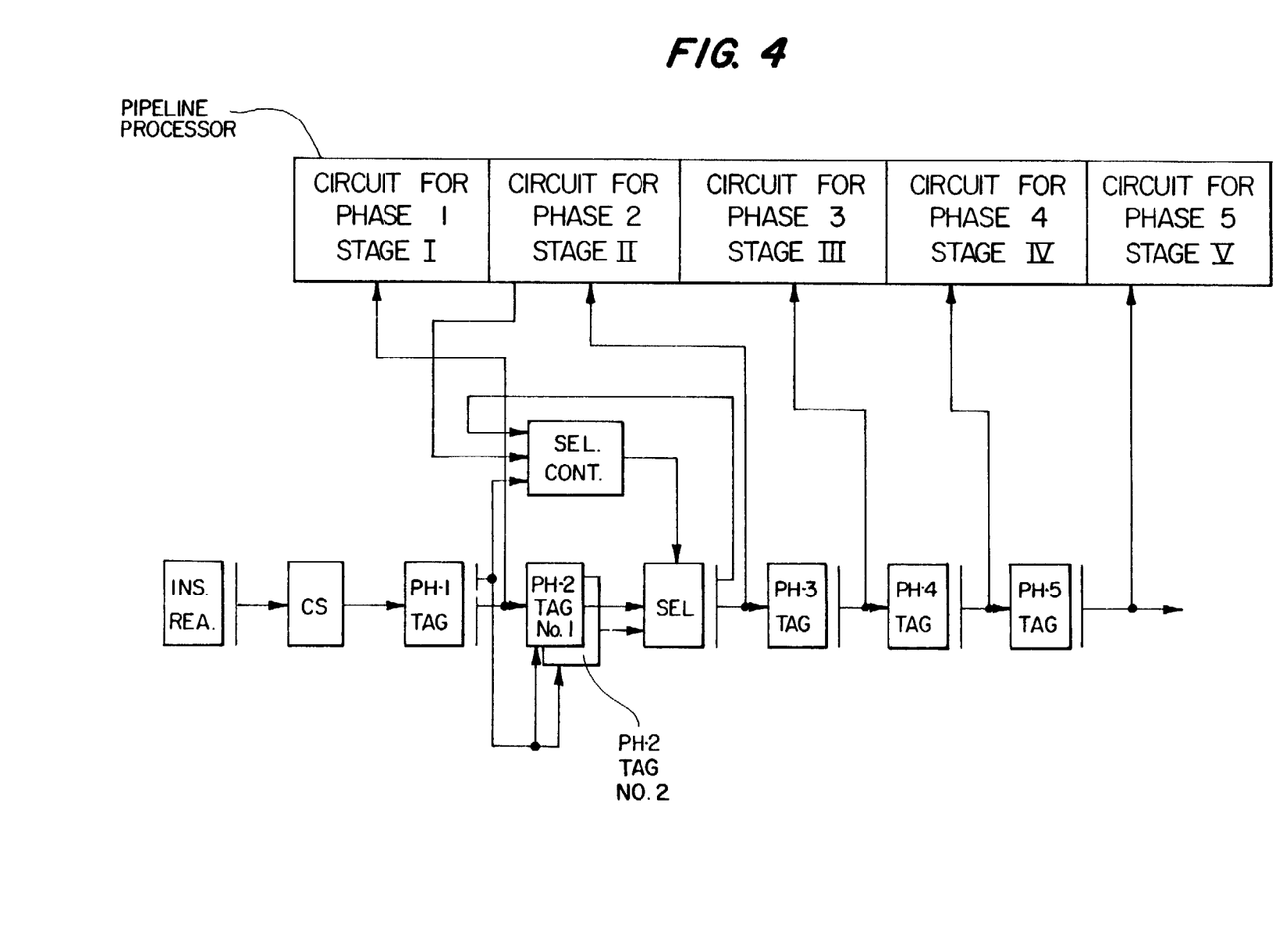
FIG. 4 is a diagram of a series of tag registers which are used in a pipeline control system according to an embodiment of the present invention.
Figure 5:
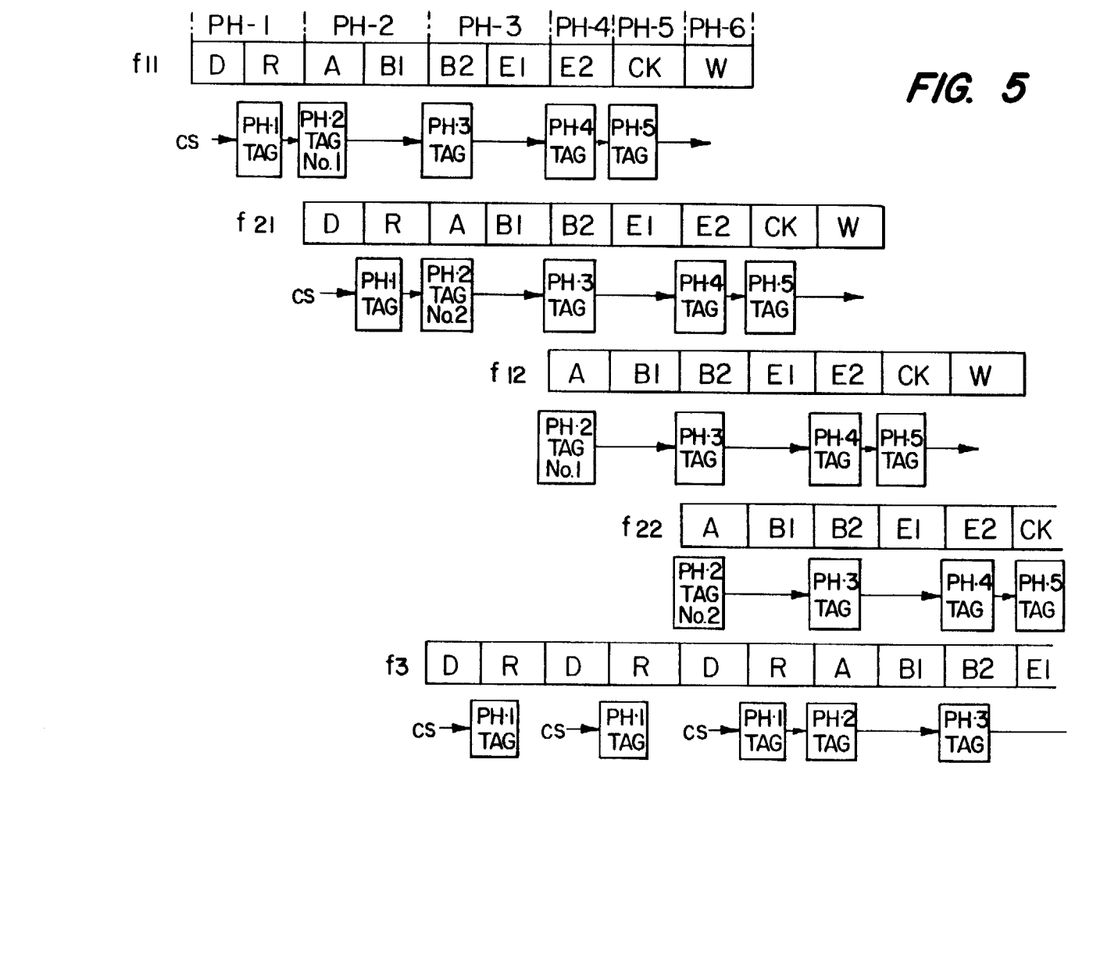
FIG. 5 is a diagram illustrating, in series, an operation of the series of tag registers of FIG. 4.

An embodiment of the present invention is illustrated in FIGS. 4 and 5. FIG. 4 illustrates a series of stages of processing in an pipeline processor unit, represented conceptually, during operation of a pipeline control system and how the stages are controlled by the tag register arrangement of the present invention. The series of processing cycles include cycle D for decoding in stage I, a cycle R in for reading tag data, a cycle A for operand address calculation in stage II, cycles B1 in stage II and B2 in stage III for operand read-out from a buffer memory, cycles E1 in stage III and E2 in stage IV, for operation execution, a cycle CK for operation result checking in stage V and a cycle W for result writing in stage VI. These processing cycles are divided into phases and controlled by clock cycles as shown in FIG. 1. The cycles D and R are included in phase-1 (PH.1), the cycles A and B1 are included in phase-2 (PH.2), the cycles B2 and E1 are included in (PH.4), the cycle CK is included in phase-5 (PH.5), and the cycle W is included in phase-6 (PH.6). The operational control is performed by an instruction register INS REG, a control storage CS, tag register PH.1 TAG of phase-1, tag registers PH.2 TAG No. 1 and PH.2 TAG No. 2 of phase-2, a selection controller SEL CONT, a selector SEL, tag register PH.3 TAG of phase-3, tag register PH.4 TAG of phase-4, and tag register PH.5 TAG of phase-5. The phase-2 (PH.2) contains a plurality of tag registers as indicated by No. 1 and No. 2. The contents of these two registers will be selected by the selector SEL which is controlled by output signals from the selection controller SEL CONT.

FIG. 5 illustrates an example of an operation of the device in FIG. 4. When the operation consists of two operation flows f11 and f21, a tag of phase-1 is written in the register PH.1 TAG, and tags of phase-2 are written in the registers PH.2 TAG No. 1 and PH.2 TAG No. 2, corresponding to the two flows f11 and f21, respectively. The flows of operation successively proceed from the phase-1 to the phase-5 and repeat until the completion of the operation is detected. After the first sequence of the operation flows f11 and f21 has been executed, the next sequence of the operation flows f12 and f22 is repeated in the same manner as the operation flows f11 and f21 if there is no change in the operation command. In the operation flow f12, the register PH.2 TAG No. 1 is used as a tag of phase-2, and the flow is initiated from the address calculation cycle A of the phase-2 because the tag data was fetched and stored in PH.2 TAG No. 1 during one of the repeats of flows f11 and f21. Namely, the cycle D, for decoding, and the cycle R, for reading, of phase-1 are omitted. In the operation flow f22, the register PH.2 TAG No. 2 is used as a tag for phase-2, and the flow is initiated from the cycle A, for address calculation, of the phase-2 for the same reason. Namely, the cycle D and the cycle R of the phase-1 are omitted. When the instruction is switched to another instruction, a flow f3 is performed. Before the flow f3, while the previous operation flow is being repeated, the next (the flow f3 tag) tag is taken out of control storage CS and stored in tag register PH.1 TAG in phase-1 which is vacant state during the repeated flows. The cycle D and the cycle R are repeated in the flow f3 until a completion of the previous operation is detected. After the completion of the previous operation has been detected, the operation is immediately switched to the f3 operation flow, and the cycle A and subsequent cycles are carried out following the cycle D and the cycle R. If the end of the repetition is detected in the phase-2 of the flow f22, for example, the phase-2 of the next flow f3 is immediately started following said phase-2 of the flow f22. That is to say, the additional operation flow f2' required in the conventional operation of FIG. 3, is eliminated. Consequently, the operation speed of the pipeline-type computer system can be increased.

The tag data stored in the PH.2 TAG registers of phase-2 are selected by the selector controller SEL CONT. The above-mentioned selection can be effected by employing either a selection bit in the tags of phase-2 or a selection correct signal SS which is applied to the selection controller SEL CONT. Further, the number of tag registers in the phase-2 need not be limited to two, i.e, tag No. 1 and tag No. 2, but can be three or more.

Figure 6:
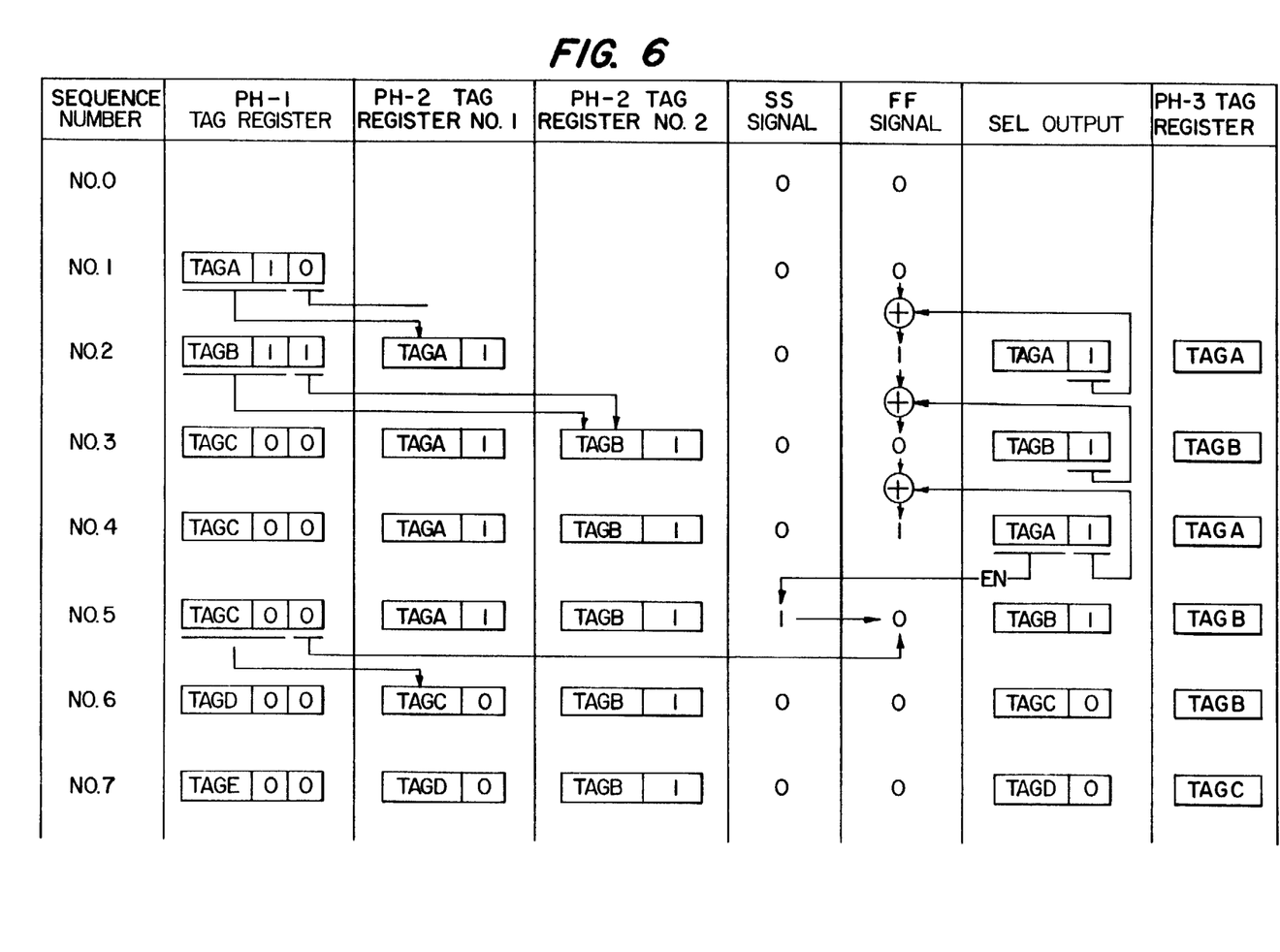
FIG. 6 illustrates tag data or micro instruction flow in the present invention.
Figure 8:
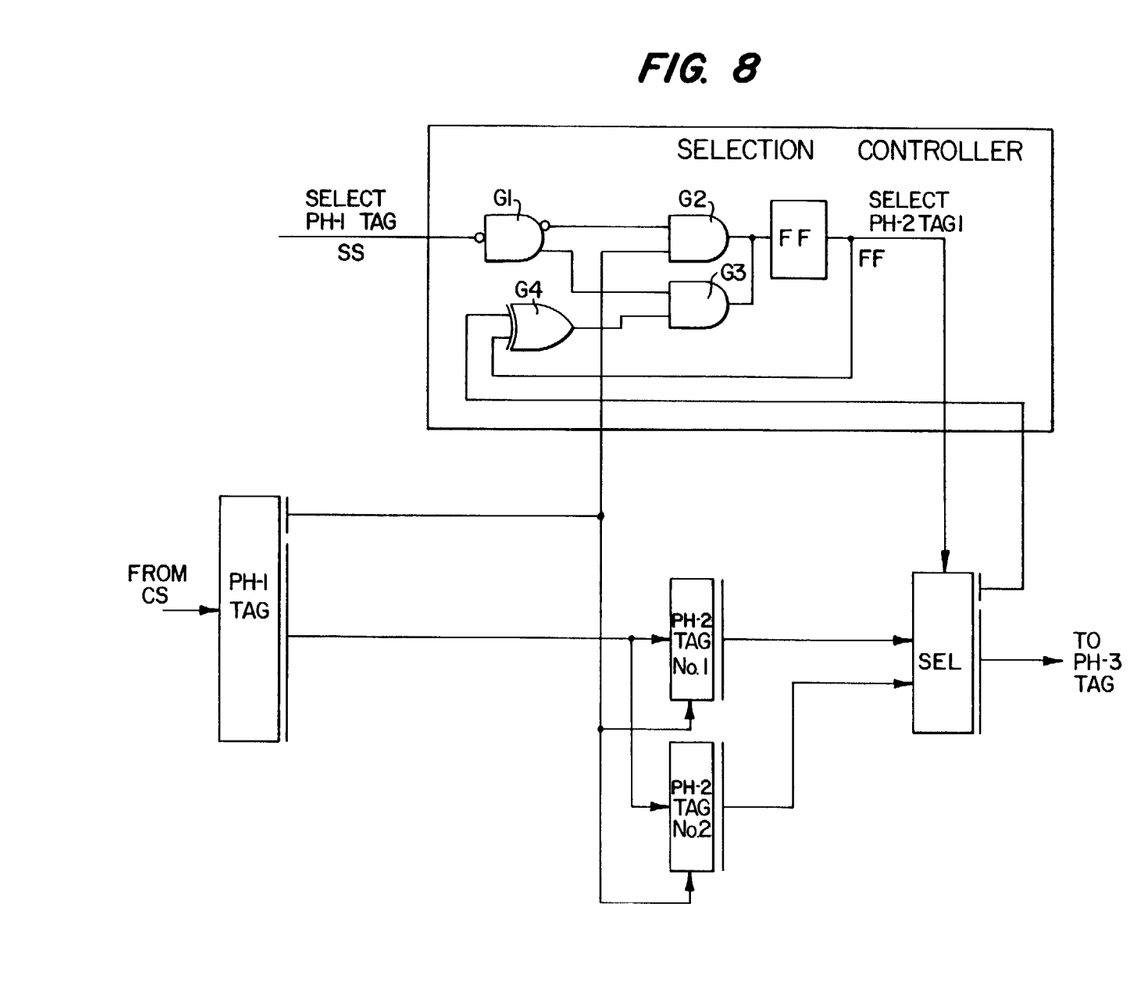
FIG. 8 is a detailed diagram of the selection controller of the present invention.

FIG. 6 illustrates the transitions of the state of the tag registers in the operation of FIG. 5 and FIG. 8 illustrates the construction of the selection controller which uses and produces the following described signals. The signal SS changes to "1" when the termination of an instruction flow is detected in phase PH.2 and signal FF is the output of a flip-flop FF (FIG. 8) in the selection controller SEL CONT. TAG A in FIG. 6 corresponds to the flows f11 and f12, TAG B corresponds to flows f21 and f22 and TAG C corresponds to flow f3. The rightmost bit in the PH.1 register is used by the selection controller SEL CONT. to select between the No. 1 and No. 2 PH.2 TAG registers. The rightmost bit is not loaded into the PH.2 TAG register. The bit which becomes the rightmost bit in the PH.2 TAG register is also not loaded into the PH.3 TAG register.

In the initial state of the final cycles or phases of the repeat flow instruction represented by Step No. 0 both the SS and FF signals are "0". In step 1, the TAG A data having a rightmost bit of "0" is read from control storage CS and loaded into the PH.1 TAG register. In Step 2, the TAG B data having a rightmost bit of "1" is read from the control storage CS and loaded into PH.1 TAG register while the TAG A data is simultaneously shifted into the PH.2 TAG register No. 0. At this stage, the signal FF is "0" and the selector SEL will output the contents of PH.2 TAG register No. 0 which is the TAG A data. The signal SS is "0" and the output of an Exclusive Or gate G4 in the selection controller SEL CONT. and the FF signal becomes "1".

In step No. 3, the rightmost bit of TAG B is "1" and as a result, the TAG B data is shifted to the PH.2 TAG register No. 1 while the TAG C data is simultaneously read from control storage and stored in the PH.1 TAG register. The signal FF is "1" resulting in the selector SEL supplying the contents of the PH.2 TAG register No. 1 (TAG B data), while the preceding output (TAG A data) of the selector SEL is loaded into the PH.3

TAG register. In step No. 4, the rightmost bit of the output from the PH.1 TAG register in steps 2 and 3 is "1" indicating that the PH.2 TAG register is full prohibiting retrieval of data from the control store CS and transfer of data from the PH.1 TAG register to the PH.2 TAG register. Since the FF signal is "0" in step No. 3, the selector outputs the TAG A data from the PH.2 TAG register No. 2 and the signal FF becomes "1".

In step No. 5, stage II of the pipeline execution unit indicates that the instruction that which is executing and using the TAG A data is finished and the next flow will continue with the TAG B data. When the execution terminates the signal SS becomes "1". Since the rightmost bit in the PH.1 TAG register is "0" the signal FF becomes "0" and TAG B of the PH.2 TAG register No. 1 is output by the selector SEL.

In step No. 6, the prohibition on reading from the control store CS and the shifting from PH.1 to PH.2 is removed when the SS signal is delivered from step No 5. As a result, TAG D data is loaded into the PH.1 TAG register, the TAG C data is shifted to the PH.2 TAG register No. 0 and since the signal FF is "0" the TAG data from the PH.2 TAG register No. 0 will be delivered by the selector SEL. In step No. 7 and subsequent steps, the TAG data or micro instruction shifts from the control storage CS through the PH.2 TAG register No. 0.

Figure 7:
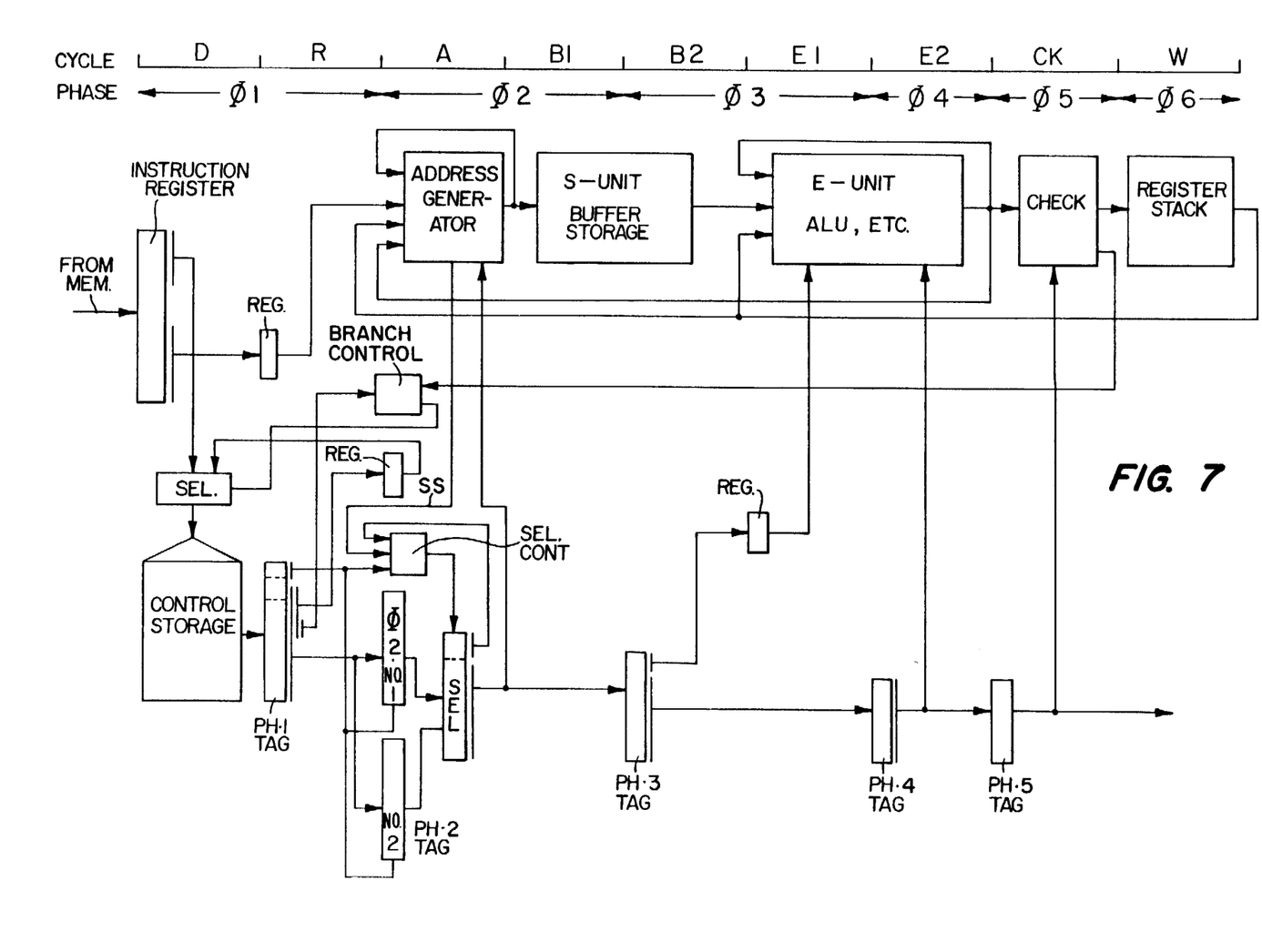
FIG. 7 is a detailed diagram showing the connection of the present invention.

FIG. 7 illustrates in more detail how the present invention is connected to a pipeline execution unit. At the top of FIG. 7 the cycles, as also illustrated in FIG. 2, are shown. Each of the TAG registers in the control section is loaded in accordance with the cycle illustrated at the top of the page. The outputs of each TAG register are used to control the indicated portion of the pipeline execution unit.

The address generator associated with the A cycle is a three input adder for calculating operand addresses and at least three registers are provided in the input stage of the address generator. The selection of registers is controlled by the output of one of the PH.2 TAG registers output through the selector SEL. The S-unit is a buffer storage unit which stores the operands. In this unit are control circuits for controlling buffer storage. The E-unit is an arithmetic logic unit (ALU) which performs some type of calculation on the operands and is controlled by the output of the PH.3 TAG register. If the output values of the ALU need to be normalized such as when floating point values are calculated or the like, this process is controlled by the PH.4 TAG register. The check unit is a comparison unit which determines whether the output is positive, negative or zero so that branching control, error detection, etc., can be carried out. The PH.5 TAG register controls the output checking. The control of the storage of the result in the generate purpose register stack during phase 6 (the write cycle) is accomplished using the output of the PH.5 TAG register. The non-named registers in FIG. 7 are used to provide the proper timing for application of the appropriate TAG data (microinstruction) to the execution section.

The Branch Control unit of FIG. 7 determines whether branching of the microprogram is necessary based on the output of the check unit and the microinstruction being executed. The branch control unit is not part of the present invention.

The details of the selection controller of FIGS. 4 and 7 are illustrated in FIG. 8. Gates G1-G4 logically analyze the signals indicating which PH.2 TAG register should be selected by selecto SEL and which register should receive the tag data from the PH.1 TAG register. The selection signal is stored in flip-flop FF and controls the next selection through a feed back arrangement. When the upper most bit of the PH.1 TAG register is "0" the PH.2 TAG register No. 0 is selected and when the uppermost bit is "1" then the PH.2 TAG register No. 1 is selected. The input signal SELECT PH.1 TAG (SS) is delivered when the preceding instruction has terminated. As a result, when the most significant bit is "1", the flip-flop FF is set. If the selector is arranged so that the PH.2 TAG register No. 1 is selected when the SELECT PH.2 TAG signal is "1", the setting side for the PH.2 TAG register can be selected by the PH.1 TAG register. For example, when the output of the flip-flop FF is "1" it is inverted by Exclusive Or gate G4 and sets the flip-flop FF again through AND gate G3. At that time, the other output of gate G3 is "1".

The many features and advantages of the invention are apparent from the detailed specification and it is intended by the appended claims to cover all such features and advantages of the system which fall within the true spirit and scope of the invention. Further, since numerous modifications and changes will readily occur to those of skill in the art, it is not desired to limit the invention to the exact construction and operation illustrated and described, and accordingly, all suitable modifications and equivalents may be resorted to, falling within the scope of the invention.

What is claimed is:

1. A pipeline control system for a pipeline processor in which a flow for processing an instruction successively proceeds through a plurality of processing stages, predetermined tag data is applied simultaneously to each of said processing stages to simultaneously control processing in each of said processing stages, a plurality of processing flows for a plurality of instructions proceed successively through the pipeline and maintain a time lag therebetween, said control system comprising:

instruction register means for receiving and holding instructions to be executed by the pipeline processor;

a control storage unit, connected to said instruction register means and storing tag data, which in the first processing stage is output from said control storage unit at an output in response to an instruction;

a selector having inputs; and a plurality of tag registers, each connected respectively to the output of said control storage unit and to the inputs of said selector and to said pipeline processor, for storing tag data for the second processing stage which controls repetitive execution of a first sequence of operation flows of processing in response to predetermined tag data for an instruction which requires repeated flows for execution, and tag data is selected by said selector from predetermined tag data stored in said tag registers for the second stage for executing a second sequence of operation flows for the instruction, execution of the second sequence of operation flows being initiated from the second processing stage without executing the first processing stage.

2. A pipeline control system for a pipeline processor having decode, read, address calculation, operand readout and execute stages, said control system comprising:

instruction register means for receiving and holding instructions to be executed by the pipeline processor;

a control storage unit, having an input connected to said instruction register means, storing predetermined tag data used in controlling the execution of the instructions by the pipeline processor, the tag data being read out at an output in response to the instructions;

a first tag register, connected to the output of said control storage unit and to the pipeline processor, for storing the tag data from said control storage unit during the decoding and reading stages;

second tag registers, connected to said first tag register, for receiving the tag data stored in said first tag register;

selection controller means, connected to the pipeline processor and said first tag register, for receiving an instruction execution termination signal from the pipeline processor and producing a selection control signal;

a selector, connected to said selection controller means, said second tag registers and the address calculation stage, selecting the contents of one of said second tag registers in dependence upon the selection control signal, receiving tag data stored in said second tag registers and supplying the tag data, stored in the one of the said second tag registers selected, to the address calculation stage of the pipeline processor; and a third tag register, connected to said selector and the execute stage of the pipeline processor, for receiving the tag data stored in the selected one of said second tag registers and producing signals controlling the execute stage.

3. A pipeline control system as recited in claim 2, wherein said selector selects the contents of a one of said second tag registers before the instruction execution termination signal is received and said selector selects, after the receipt of the instruction execution termination signal, another one of said second tag registers.

4. A pipeline control system for a pipeline execution unit executing instructions by performing an operation in stages where at least one instruction is a multiple operation instruction requiring multiple operations and the stages within an operation include a first decode stage and a second address stage where the second address stage signals termination of the multiple operation instruction each instruction being output by an instruction register, said control system comprising:

control storage and decoding means, connected to the instruction register, for decoding each instruction and outputting control data in the first decode stage for controlling each of the stages where different control data are associated with different instructions;

means, connected to said control storage and decoding means, for storing first and second control data for first and second instructions where the second control data is stored during the multiple operations;

means, connected to said means for storing, for selecting as an output, during the address stage, the first control data during the multiple operation instruction and the second control data at the termination of the multiple operation instruction, the termination of the multiple operation stage occurring in the second address stage; and means, connected to said selection means and the pipeline execution unit, for performing successive stages of each operation responsive to the output of the selection means.

* * * * *

UNITED STATES PATENT AND TRADEMARK OFFICE
CERTIFICATE OF CORRECTION

PATENT NO. : 4,794,518

DATED : December 27, 1988

INVENTOR(S) : Yoshihiro Mizushima

It is certified that error appears in the above-identified patent and that said Letters Patent is hereby corrected as shown below:

FRONT PAGE, after "[30] Foreign Application Priority Date" insert the following:

--Jul. 28, 1979 [JP] Japan...... 96231--.

Signed and Sealed this

Twenty-second Day of August, 1989

Attest:

DONALD J. QUIGG

*Attesting Officer*  *Commissioner of Patents and Trademarks*